(12) United States Patent
Redana et al.

(10) Patent No.: US 8,855,640 B2
(45) Date of Patent: Oct. 7, 2014

(54) PARTITIONING RESOURCES ON A TARGET SIDE OF A HANDOVER OF A USER EQUIPMENT BASED ON DATA TRAFFIC INDICATION

(75) Inventors: Simone Redana, Munich (DE); Martin Doettling, Neubiberg (DE); Bernhard Raaf, Neuried (DE)

(73) Assignee: Nokia Siemens Network Oy, Espoo (FI)

( * ) Notice: Subject to any disclaimer, the term of this patent is extended or adjusted under 35 U.S.C. 154(b) by 427 days.

(21) Appl. No.: 13/265,967

(22) PCT Filed: Apr. 24, 2009

(86) PCT No.: PCT/EP2009/054991
§ 371 (c)(1),
(2), (4) Date: Dec. 12, 2011

(87) PCT Pub. No.: WO2010/121664
PCT Pub. Date: Oct. 28, 2010

(65) Prior Publication Data
US 2012/0083199 A1 Apr. 5, 2012

(51) Int. Cl.
*H04W 36/00* (2009.01)
*H04W 36/08* (2009.01)
*H04W 36/10* (2009.01)
H04B 7/26 (2006.01)
H04W 16/26 (2009.01)
H04W 72/04 (2009.01)

(52) U.S. Cl.
CPC ............. *H04W 36/08* (2013.01); *H04W 36/10* (2013.01); *H04B 7/2606* (2013.01); *H04W 16/26* (2013.01); *H04W 72/0426* (2013.01)
USPC ........... 455/436; 455/437; 455/439; 455/442; 455/452.2; 455/453

(58) Field of Classification Search
CPC ..... H04W 36/00; H04W 36/26; H04W 36/30; H04W 36/08; H04W 36/10; H04W 72/0426; H04W 72/0433; H04W 16/26; H04B 7/2606
USPC .............. 455/436, 437, 439, 442, 452.2, 453
See application file for complete search history.

(56) References Cited

U.S. PATENT DOCUMENTS 8,605,685 B2 * 12/2013 Song et al. .................... 370/332
2005/0272428 A1 * 12/2005 Tanabe et al. ................. 455/439

(Continued)

FOREIGN PATENT DOCUMENTS

EP          1 909 521 A1    4/2008
EP          1909521 A1 *   4/2008

*Primary Examiner* — Khai M Nguyen
(74) *Attorney, Agent, or Firm* — Harrington & Smith

(57) ABSTRACT

It is described a method for partitioning radio transmission resources within a telecommunication network. The method includes (a) preparing a handover of a user equipment from a source access point being assigned to a source side of the telecommunication network to a target access point being assigned to a target side of the telecommunication network, (b) transferring a pre-announcement message from the source side to the target side indicating the handover, wherein the pre-announcement message is indicative for the amount of data traffic being associated with the user equipment, and (c) partitioning the radio transmission resources on the target side based on the pre-announcement message. It is further described a source side network element and a target side network element for controlling a partitioning of radio transmission resources within a telecommunication network. Furthermore, a computer program for controlling the above described method is described.

19 Claims, 2 Drawing Sheets

(56) References Cited

U.S. PATENT DOCUMENTS

| | | | |
|---|---|---|---|
| 2006/0239229 A1* | 10/2006 | Marinescu et al. | 370/331 |
| 2006/0246906 A1* | 11/2006 | Vaittinen et al. | 455/442 |
| 2008/0285500 A1* | 11/2008 | Zhang et al. | 370/315 |
| 2011/0194483 A1* | 8/2011 | Ji et al. | 370/315 |

* cited by examiner

PARTITIONING RESOURCES ON A TARGET SIDE OF A HANDOVER OF A USER EQUIPMENT BASED ON DATA TRAFFIC INDICATION

FIELD OF THE INVENTION

The present invention generally relates to the field of mobile telecommunication networks and in particular to Long Term Evolution (LTE) telecommunication networks, where relay nodes are used to increase a cell coverage. In particular, the present invention relates to a method for partitioning radio transmission resources within a telecommunication network on target side of a handover of a user equipment. Further, the present invention relates to a source side network element and to a target side network element for controlling a partitioning of radio transmission resources within a telecommunication network on a source and target side of a handover of a user equipment. Furthermore, the present invention relates to computer program for controlling the above described radio transmission resources partitioning method.

ART BACKGROUND

In order to allow for cost efficient and flexible deployment solutions, within the third generation partnership project (3GPP) relaying is investigated as one of the new technologies for Long Term Evolution (LTE) networks and in particular for Long Term Evolution Advanced (LTA-Advanced) networks. It has been shown that with the usage of a relay node (RN) or more relay nodes (RNs) the spatial coverage and/or the capacity of a base station (BS) can be significantly increased. Further, areas can be covered which without using RN would suffer from bad radio conditions. Such areas are located typically at the edge of a cell being served by a particular BS.

Apart from this main goal of coverage extension, introducing relay concepts can also help in (a) providing a high-bit-rate coverage in high shadowing environments, (b) reducing average radio-transmission power at a user equipment (UE), thereby leading to long battery life, (c) enhancing the cell capacity and effective throughput, e.g., increasing cell-edge capacity and balancing cell load and (d) enhancing the overall performance and deployment cost of a Radio Access Network (RAN).

Also the IEEE standardization bodies such as the IEEE 802.11 and IEEE 802.16 group notice and investigate the potential of relaying technology. In this respect it is mentioned that the specification IEEE 802.16 is influenced for instance by pre-standardization activities such as for instance Wireless World Initiative New Radio (WINNER) project (see http://www.ist-winner.org/), wherein investigations regarding RN are carried out. This means that telecommunication networks relying on RN are achieving the level of maturity that is needed in ongoing standardization activities. The best evidence of this maturity is the IEEE 802.16j standardization where RNs are added on top of the IEEE 802.16e standard. This recent development has increased the pressure to consider RN also in LTE standardization.

There are many kinds of relay systems proposed starting from the simplest amplify/forward RN, which is applied e.g. in single frequency Digital Video Broadcasting-Handhelds (DVB-H) networks ending up to the most complex one, which utilizes a network coding to improve the overall performance. The most common type of RN that is proposed for use of RN in cellular networks (cellular relaying) is a decode/forward type of RN, where an input signal is detected and typically decoded and retransmitted using the same procedure as in the original transmission. Such an approach is assumed in this document.

Cellular relaying can be realized at the different layers of a protocol stack, which layers are described by the well known Open Systems Interconnection Reference Model (OSI model). A simple amplify and forward relaying can be realized at the Layer 1 of the protocol stack where the RN is required to have only (some part of) the PHY layer. Layer 2 RNs, which include the protocol stack up to the Media Access Control (MAC)/Radio Link Control (RLC) layers, enable the possibility of doing decentralized radio resource management. Layer 3 or higher layer RNs could almost be considered as wireless base stations and support all the protocol layers of normal base stations. Layer 3 or higher layer relaying is assumed in this document for the sake of simplicity in notations. However, the described radio resource partitioning procedure can easily be extended for other types of relays (e.g. layer 2) as well.

In order to make LTE-Advanced economically viable, it is required to be as much backward compatible with 3GPP Release 8 as possible. This is especially important for the UE side, as it will allow users to benefit from relaying with their Release 8 terminals. Based on previous 3GPP experiences it is herein assumed that full backward compatibility is required from UE side, i.e. Release 8 and LTE-Advanced UEs should work equally well in Release 8 and LTE-Advanced networks. At the network side software and even hardware updates between standard releases may be possible but preferably they should be as small as possible. Hence, from the viewpoint of a UE the serving network node respectively the current access point should function in exactly the same way as a Release 8 BS, which is called enhanced NodeB (eNB). Due to this requirement the reduction of BS functionalities when defining a RN will be difficult and RNs need to support all main eNB functions of a BS respectively of an eNB. Due to this fact it is often assumed that RNs, which will be employed in future telecommunication networks, will be capable of flexible resource sharing with the eNB that controls them. Moreover, it is often assumed that (a) the telecommunication network will allow at maximum 2 hops (BS-UE and BS-RN-UE) and (b) the network topology has a tree design (no connections between different RNs are allowed), but again the described resource partitioning procedure also works in the general case without these restrictions, indeed it will be applicable to intermediate RNs as well.

In the following there will be considered by way of example a common handover situation with reference to FIG. 2. A user equipment UE is originally located within source coverage area CA1 being spanned by a source relay node RN1. CA1 and RN1 are located within a source cell, which is spanned by a source base station BS1. The UE is connected to the source relay node RN1 via a radio access link. The source relay node RN1 is connected to the source base station BS1 via a so called backhaul link.

The UE is moving into a target coverage area CA2, which is located within a target cell of the telecommunication network. The movement of the UE is indicated in FIG. 2 with an arrow origination from the UE. The target coverage area CA2 is spanned by a target relay node RN2c, which is connected to a target base station BS2. The target base station BS2 spans the target cell. Apart from the target relay node RN2c there are further relay nodes RN2a and RN2b connected to the target base station BS2. Each of these further relay nodes RN2a and RN2b may serve further UE's, which for the sake of clarity are not depicted in FIG. 2. In addition, further UE's may be connected directly to the target base station BS2. Therefore, the radio transmission resources, which are in total available for the target cell, have to be distributed among various radio links (access links between a UE and a RN, backhaul links between a RN and the target base station and/or direct links between a UE and the target base station).

Further relay nodes may be connected to the source base station BS1 and may serve further UE's and further UE's may be connected directly to the base station BS1. For sake of clarity they are not depicted in FIG. 2. Also in the source cell available resources have to be distributed among various radio links.

However, the handover from RN1 to RN2c may fail or at least result in bad performance, if the resource partitioning is not properly done by the target base station BS2. For example, if assuming that in the non depicted coverage areas of RN2a and RN2b there have occurred high data traffic dynamics, most of the available radio transmission resources may be assigned to backhaul and access links of RN2a and RN2b. If RN1 wants to handover the UE to RN2c, the handover (HO) could fail because RN2c does not have enough radio transmission resources to accommodate the additional UE that RN1 wants to handover to RN2c. Generally speaking, a HO of UEs to a target RN may fail because (i) there are not enough available radio transmission resources for the target RN access link and/or (ii) there are not enough available resources for target RN backhaul link. Therefore, an appropriate radio transmission resource partitioning may be necessary in order to improve the success probability of a HO procedure and therefore improve the overall network performance. If the handover is executed despite an insufficient availability of resources, then the performance of the UE that was handed over, or the other UEs, or both, will be degraded.

A radio transmission resource partitioning configuration is a slower procedure than a HO. When a HO is initiated the HO procedure needs to be performed quickly while the configuration of a new radio transmission resource partitioning could require longer time. Therefore, reconfiguring the resource portioning at the target BS when a HO request towards the target RN is received may not be sufficient in order to ensure the success of a HO process.

A new radio transmission resource partitioning configuration may require signalling on the Broadcast Control Channel (BCCH) because a radio transmission resource partitioning may involve a Multi-Media Broadcast over a Single Frequency Network (MBSFN) sub-frame allocation. These MBSFN subframes have been proposed initially to make UEs aware that normal transmission from the access point is suspended for that subframe and instead a so called Single Frequency Network (SFN) transmission, which is a coordinated transmission from several access points, is performed in that subframe. However instead of a SFN transmission any other operation can be done instead, including a backhauling transmission from a mother base station to its assigned RN.

As a consequence of a new radio transmission resource partitioning configuration a new MBSFN sub-frame allocation may be needed in order to provide radio transmission resources for backhauling RNs to the respective mother BS. However, signalling on the BCCH occurs infrequently (for instance every 80 ms). This may introduce a significant delay between the decision for a new radio transmission resource partitioning and its configuration. In this respect it is mentioned that the signaling of a resource partitioning can be done over different control channels, e.g. the Physical Downlink Control Channel (PDCCH) for the scheduling, the BCCH for the configuration of MBSFN sub-frames, etc.

There may be a need for improving a partitioning of radio transmission resources in connection with a handover of a user equipment.

SUMMARY OF THE INVENTION

This need may be met by the subject matter according to the independent claims. Advantageous embodiments of the present invention are described by the dependent claims.

According to a first aspect of the invention there is provided a method for partitioning radio transmission resources within a telecommunication network. The provided method comprises (a) preparing a handover of a user equipment from a source access point being assigned to a source side of the telecommunication network to a target access point being assigned to a target side of the telecommunication network, (b) transferring a pre-announcement message from the source side to the target side indicating the handover of the user equipment, wherein the pre-announcement message is indicative for the amount of data traffic being associated with the user equipment, and (c) partitioning the radio transmission resources on the target side of the telecommunication network based on the pre-announcement message.

The described method is based on the idea that a new and appropriate radio transmission resource partitioning configuration on the target side of a handover (HO) can be achieved well timed before the handover is initiated i.e. before the target access point is requested to increase its load with the additional data load being associated with the user equipment (UE). Thereby, the chance for completing the HO successfully may be enhanced because the necessary radio transmission resources for serving the UE on the target side can be reserved for the UE by the described partitioning procedure on the target side.

Generally speaking, the new radio transmission resource partitioning is computed on the target side taking into account the data traffic that will probably be received soon. It is mentioned that also on the source side there might be carried out preparation(s) with respect to a future source side radio transmission resource partitioning, wherein identified radio transmission resources on the source side will be released after the handover occurs when the user is handed over.

Within this document the term "radio transmission resource" may particularly denote any kind of ability of the telecommunication network to transmit data independently whether the data are payload data, reference data, control data or the like via a radio link between a transmitting network element and a receiving network element. Typically, for the data transfer the overall available radio transmission resource is subdivided into a plurality of minimum radio transmission resource units. This minimum unit may be called a physical resource block (PRB), a chunk and/or a slot. The minimum unit may be illustrated as a two-dimensional element within a coordinate system having a time-axis and a frequency-axis. For example, different radio transmission resources may be distinct from each other by the fact that they relate to different times of the same frame and/or different frequencies, e.g. two radio transmission resources may relate to the same time but may relate to different frequencies, i.e. the data transmitted by using the two radio transmission resources may be transmitted on different frequencies. In general, radio transmission resources may be distinguishable from each other by any suitable parameter, e.g. frame number, subframe number, time, used frequency band, coding scheme or the like. In advanced applications, further dimensions of resource units, in particular in the spatial domain, may exist, i.e. a re-use of resources in different spatial layers or beams.

The UE may be any type of communication end device, which is capable of connecting with an arbitrary telecommunication network access point such as a base station or a relay node. Thereby, the connection may be established in particular via a wireless radio transmission link. In particular the UE may be a cellular mobile phone, a Personal Digital Assistant (PDA), a notebook computer and/or any other movable communication device.

Preparing the HO may comprise performing of measurements by the UE in order to determine the radio link qualities between (a) the UE and the source access point on the one hand and (b) the UE and the target access point on the other hand. Based on the measurement values being indicative for the respective radio link it may be decided which neighboring access point is the most probable candidate for the target access point.

According to an embodiment of the invention the source access point of the user equipment is (a) a source base station or (b) a source relay node being connected to a source base station. Thereby, the source base station (BS) and, if applicable, also the source relay node (RN) are assigned to the source side of the telecommunication network.

According to the first alternative the UE before the HO is directly served by the source BS. In this document the connection between a UE and a serving BS is called a direct connection or a direct link.

According to the second alternative (b1) the source RN is connected to the source BS via a radio link and (b2) the UE before the HO is served by the source RN. In this document the connection between a RN and its serving BS (mother BS) is called a backhaul link. Further, the radio connection between a UE and a serving RN is called access link.

At this point it is mentioned that on the source side there may be of course at least one further UE and/or one further RN. Thereby, the further RN may preferably also be connected via a backhaul link to the source BS. The further UE may be connected directly to the source BS via a direct link or to one on the RN's via an access link.

According to a further embodiment of the invention the target access point of the user equipment is (a) a target base station or (b) a target relay node being connected to a target base station. Thereby, the target BS and, if applicable, also the target RN are assigned to the target side of the telecommunication network.

The various connections on the target side may be denominated in accordance with the various connections on the source side described above. Specifically, the connection between the UE and the target BS may be called a direct link, the connection between the UE and the target RN may be called an access link and the connection between the target RN and the target BS may be called a backhaul link.

Further, in accordance with additional network elements (i.e. further RN's and/or further UE's) on the source side there may also be further network elements assigned to the target side. The described partitioning of the radio transmission resources may take into account these further network elements on the target side. Specifically, radio transmission resources may be taken from at least one direct link, from at least one access link and/or from at least one backhaul link associated with at least one of the further network element in order to have enough radio transmission resources available for the expected amount of data being associated with the UE which is supposed to be handed over to the target side of the telecommunication network.

According to a further embodiment of the invention the target side of the telecommunication network comprises (a) the target base station and a relay node being connected to the target base station and (b) partitioning the radio transmission resources on the target side is carried out at the target base station or is negotiated between the target base station and the relay node being connected to the target base station.

According to the first alternative the radio transmission resource partitioning is done centrally at the target BS, which has the full responsibility to allocate available resources for directly serving UE(s) (direct link(s)), for the communication with connected RN(s) (backhaul link(s)) and for the RN(s) to serve their UE(s) (access link(s)).

According to the second alternative the radio transmission resource partitioning is negotiated among the target BS and its connected RN(s). Thereby, a connected RN respectively the connected RN may be the target RN representing the target access point.

According to a further embodiment of the invention partitioning the radio transmission resources on the target side is carried out at a central unit that is responsible to perform the partitioning of radio transmission resources for one or more base stations. Such a central unit could be a so called Self Organizing Network (SON) entity that is responsible for configurations of several base stations and/or relay nodes.

According to a further embodiment of the invention the source side is a source cell and the target side is a target cell. This may mean that the described radio transmission resource partitioning method can be carried out for so called inter cell HO, wherein the UE is handed over from a source cell to a target cell of the telecommunication network. Thereby, at least one RN is involved in the handover. The relay node(s) may be situated within the source cell and/or within the target cell. Accordingly, the described method may contribute in order to increase the success rate for such inter cell HO.

According to a further embodiment of the invention the pre-announcement message is transferred from a source base station to a target base station. If at least one RN is involved on the source side and/or on the target side, i.e. if the UE is attached to a RN on the source side and/or on the target side, no additional messages may be needed between theses RN and their serving BS's, i.e. between a source RN and the source BS and/or a target RN and the target BS. Thereby, the respective BS may have all information regarding the access links for the served UE. This information may particularly include the radio transmission resource assignment to the respective access link and/or to the respective backhaul link. This information may have already been transferred from the respective RN to its serving BS. In this respect it is mentioned that such an information flow to the source BS and/or the target BS is requested by a centralized approach for controlling a HO in a relay enhanced telecommunication network, wherein solely a BS is responsible for controlling the HO of the UE.

Further, it is mentioned that (a) the source BS may represent the source access point for the UE before the HO or (b) the target BS station may represent the target access point for the UE after the HO. In the above mentioned centralized approach no more signaling information is necessary both on the source side and on the target side. In case of a decentralized approach, wherein a RN is at least partially responsible for radio resource partitioning, there may be an exchange of appropriate messages on the source side and/or on the target side. On the source side such an appropriate message may include information for the source BS in order to enable the source BS to form the described pre-announcement message. On the target side such an appropriate message may include information for the target RN representing the target access point for a proper radio resource partitioning on the target side in due time before the HO of the UE is carried out.

According to a further embodiment of the invention (a) the source access point is a source relay node being connected to a source base station, (b) the target access point is a target relay node being connected to a target base station and (c) the pre-announcement message is transferred from the source relay node to the target relay node.

In this further embodiment of the invention a HO from a source RN to a target RN is considered. Thereby, the source BS may be different from the target BS, i.e. the source side is a source cell and the target side is a target cell. In this respect it is mentioned that other configurations of a HO, wherein either on the source side or on the target side the UE is connected to the respective BS via a direct link, are from a technical point of view simplifications of this case.

Generally speaking, the serving RN respectively the source RN pre-announces to the target RN the amount of UE data traffic that it will try soon to handover to the target RN. The target BS can use this information received indirectly from the source RN respectively directly from the source BS and, if applicable also corresponding information from other neighboring RN(s) respectively BS(s) in order to pre-configure a resource partitioning that will better accommodate the data traffic that the source BS respectively the source RN and, if applicable also the neighboring BS(s) respectively the neighboring RN(s), will try to handover to it and/or to its connected RN(s).

It is mentioned that the source BS may aggregate the indications from several of its subordinate RNs and only send a comprehensive indication to the target BS respectively to the target RN. This may provide the advantage that the signaling load within the telecommunication network may be significantly reduced.

According to a further embodiment of the invention (a) the source access point of the user equipment is a source base station, (b) the target access point of the user equipment is a target relay node being connected to a target base station and (c) the source base station and the target base station are the same entity within the telecommunication network. This may mean that the described radio transmission resource partitioning method can be carried out for so called intracell HO, wherein the UE is handed over from a source access point to a target access point and wherein both access points are assigned to the same cell of the telecommunication network.

According to a further embodiment of the invention the method further comprises (a) carrying out the handover of the user equipment from the source access point to the target access point, and (b) partitioning radio transmission resources on the source side based on the amount of data traffic that is associated with the user equipment. This may provide the advantage that the radio transmission resources, which are no more needed after the HO of the UE can be assigned to one or more other radio connections on the source side. Thereby, the radio connections, which may be provided with more radio transmission resources, may be a direct link, an access link and/or a backhaul link between different types of network elements on the source side. The mentioned network elements may be UE(s), RN(s) and/or BS(s). Only when the UE is handed over the new partitioning radio transmission resources may take place and the free radio transmission resources may be used e.g. for another UE.

The partitioning procedure may be carried out based on a value of the pre-announcement message, which value is indicative for the amount of data traffic being associated with the user equipment.

It is mentioned that the radio transmission resource partitioning on the source side can also be pre-announced before the handover of the UE is carried out. However, this source side radio transmission resource, which will be released on the source side because of the handover, cannot be used for other network elements before the UE has left the source side.

According to a further embodiment of the invention (a) partitioning radio transmission resources on the target side comprises allocating radio transmission resources for the user equipment, and (b) after partitioning the radio transmission resources and before carrying out the handover of the user equipment the allocated radio transmission resources are used for another radio data transfer. This may mean that the target BS can temporarily use these allocated radio transmission resources for another purpose until the UE is handed over from the source side to the target side, wherein the target BS or a target RN represents the target access point. The allocated radio transmission resources may also be denoted pre-assigned and/or reserved radio transmission resources.

For example, the allocated radio transmission resources may be used by UE(s) being directly connected to the target BS. But since the target BS needs the full flexibility to quickly cancel this allocation of radio transmission resources, these resources should be used only for services such as for instance best effort services, which can accept such a quick resource withdrawal. Therefore, the allocated radio transmission resources should only be assigned to backhaul and access links or direct links (if a target access point is a target base station) after the UE has been handed over to the target side.

According to a further embodiment of the invention the pre-announcement message comprises an identification of the target side of the telecommunication network. This identification may be for instance an ID symbol of the target access point, the target BS and/or if applicable the target RN. Generally speaking, in the pre-announcement message instead of having only the amount of data traffic being associated with the UE also an identification tag for each candidate for a target BS respectively target RN could be added to the information about the data traffic which is supposed to be handed over in due time.

It has to be mentioned that also further or other information may be added to the pre-announcement message. Such information may be for instance (a) at what time the HO is expected, (b) the quality of service of the data traffic that will be handed over and/or (c) any other information that may impact the forthcoming radio resource partitioning.

It is mentioned that the described method may be simultaneous applied for different UEs, which are originally assigned to the source side and which may be handed over to different target sides. In this case, it is possible to group the information about different data traffics per target BS and send different HO pre-announcement message to different target sides (target base stations), or the source BS could send the same information with a cumulative message to all neighboring BS (including information also designated to other BS(s)). This could help to inform the involved BS also about the current or expected future status of neighboring sides of the telecommunication network. Further, such a cumulative information could be useful for radio transmission resource partitioning, data load balancing, interference coordination, etc.

Further, the pre-announcement message may comprise a time-out information. This time-out information may indicate how long an accomplished partitioning of the radio transmission resources (in order to be ready for accepting the amount of data traffic being associated with the UE) is supposed to be valid. This may avoid that radio transmission resources are allocated for a too long time waiting for an HO of UEs that will never happen and that the allocated radio transmission resources cannot be used by other RN(s) and/or other UE(s) in the future.

According to a further aspect of the invention there is provided a source side network element for controlling a partitioning of radio transmission resources within a telecommunication network in connection with a handover of a user equipment from a source access point being assigned to a source side of the telecommunication network to a target access point being assigned to a target side of the telecommunication network. The provided source side network element comprises a transmitting unit for transmitting a pre-announcement message from the source side to the target side indicating the handover of the user equipment, wherein the pre-announcement message is indicative for the amount of data traffic being associated with the user equipment and wherein the preannouncement message is adapted for controlling the partitioning of the radio transmission resources on the target side.

Also this aspect of the invention is based on the idea that a new and appropriate radio transmission resource partitioning configuration can be provided on the target side of a HO in due time before the target access point is requested to increase its load with the additional data load being associated with the user equipment.

With respect to the HO the source side network element is located on the source side of the telecommunication network. The described source side network element may be the above mentioned source BS or the above mentioned source RN.

According to a further aspect of the invention there is provided a target side network element for controlling a partitioning of radio transmission resources within a telecommunication network in connection with a handover of a user equipment from a source access point being assigned to a source side of the telecommunication network to a target access point being assigned to a target side of the telecommunication network. The provided target side network element comprises a receiving unit for receiving a pre-announcement message from the source side to the target side indicating the handover of the user equipment, wherein the pre-announcement message is indicative for the amount of data traffic being associated with the user equipment and wherein the pre-announcement message is adapted for controlling the partitioning of the radio transmission resources on the target side.

Also this aspect of the invention is based on the idea that an appropriate adaptation of a radio transmission resource partitioning configuration can be provided on the target side of a HO in due time before the HO is actually carried out.

With respect to the HO the target side network element is located on the target side of the telecommunication network. The described source side network element may be the above mentioned target BS or the above mentioned target RN.

According to a further aspect of the invention there is provided a computer program for partitioning radio transmission resources within a telecommunication network. The computer program, when being executed by a data processor, is adapted for controlling the above described method for partitioning radio transmission resources within a telecommunication network.

As used herein, reference to a computer program is intended to be equivalent to a reference to a program element and/or to a computer readable medium containing instructions for controlling a computer system to coordinate the performance of the above-described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the example of embodiment to be described hereinafter and are explained with reference to the example of embodiment. The invention will be described in more detail hereinafter with reference to an example of embodiment but to which the invention is not limited.

DETAILED DESCRIPTION

Figure 1:
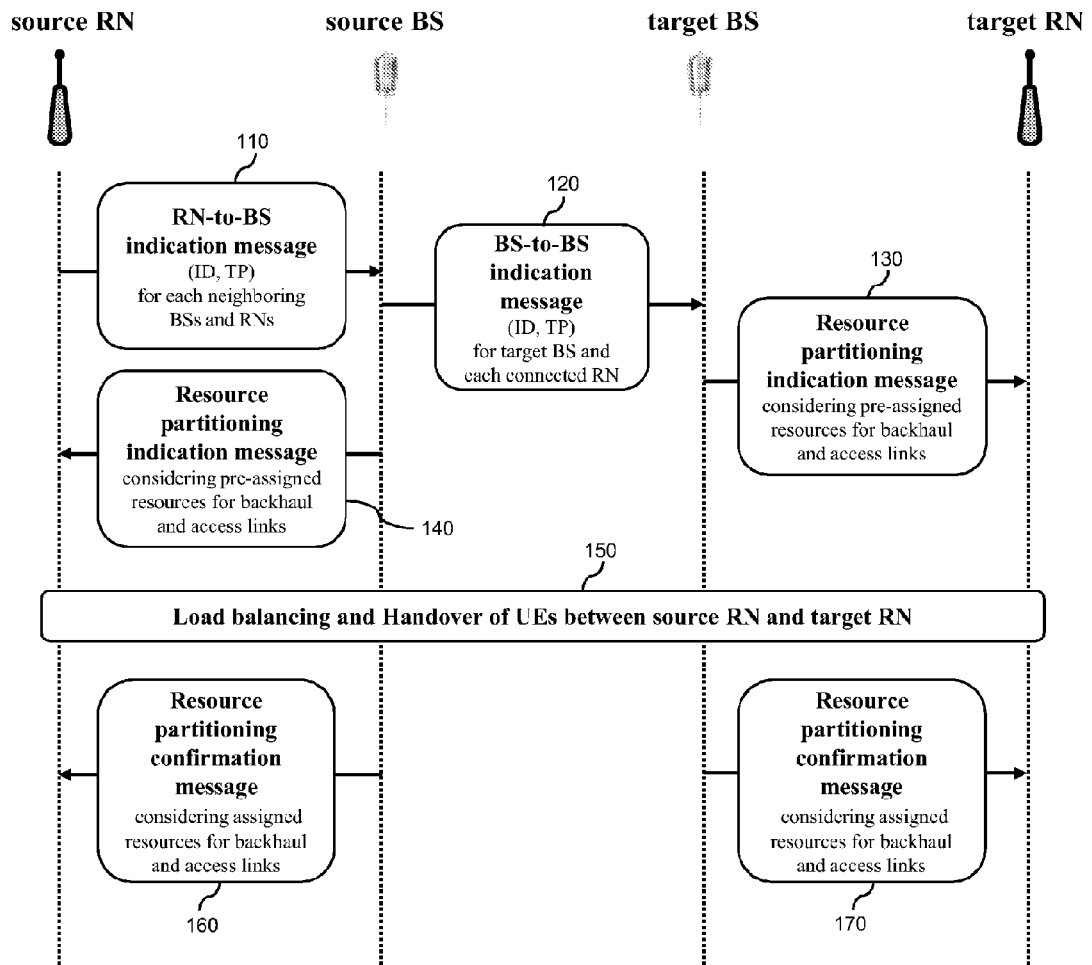
FIG. 1 shows a transactional flow diagram illustrating a message flow between various network elements which in accordance with an embodiment of the invention are adapted for carrying out a radio transmission resources partitioning in due time before a handover of a user equipment from a source relay node to a target relay node is carried out.

The illustration in the drawing is schematically.

Figure 2:
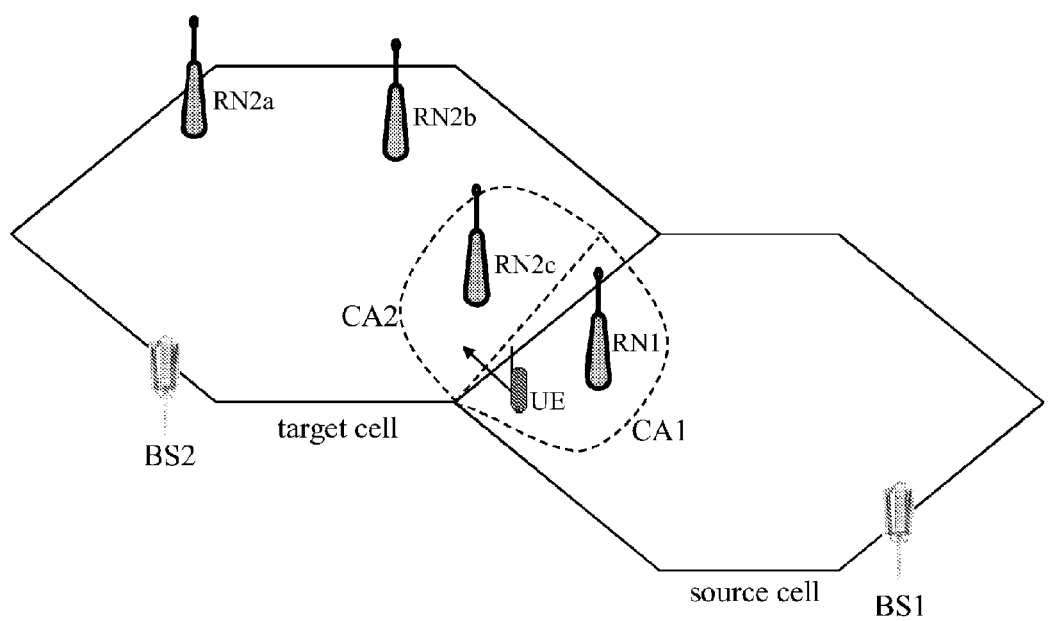
FIG. 2 shows a common handover of a UE from a source relay node to a target relay node, wherein source relay node and target relay node are connected to different base stations.

FIG. 1 shows a transactional flow diagram illustrating a message flow between a source RN and a target RN in order to (a) pre-announce a possible HO of a non depicted UE from the source RN to the target RN and (b) to carry out a radio transmission resources partitioning in due time before the HO. The source RN corresponds to the relay node RN1 depicted in FIG. 2. The target RN corresponds to the relay node RN2c depicted in FIG. 2. The source RN is connected to a source BS, which corresponds to the base station BS1 depicted in FIG. 2. The target RN is connected to a target BS, which corresponds to the base station BS2 depicted in FIG. 2.

The source RN (and each RN being backhauled by the source BS) collects measurements from its attached UEs which are expected to be handed over. Thereby, the node id (ID) of a candidate BS/RN and the amount of traffic (TP) expected to be handed over with the UE to each of the candidate BS/RN can be determined. In the scenario shown in FIG. 1, for each candidate BS and RN information about the ID and about the TP have been acquired by the respective RN. This information is inserted into a RN-to-BS indication message 110 sent from the source RN to the source BS.

The source BS may collect such information received from different backhauled RNs together with information for UEs being directly connected to the source BS. Then, available information about ID and TP at the source BS are grouped per neighbouring target BS and backhauled target RNs and are separately sent to the neighbouring target BSs. Thereby, a BS-to-BS indication message 120 is employed for each target BS and each RN being connected to the target BS.

The source BS may also send all information without grouping according to the target BS. The target BS may select from received message only the relevant information regarding itself and connected RNs.

In the following the procedure is explained for the source RN and source BS for the sake of clarity. However, it is obviously done at each RN and BS within the telecommunication network. The source BS may also aggregate the indications from several of its subordinate source RNs and only send a comprehensive indication to the neighbouring target BSs and target RNs.

Upon receiving these messages 120 from the neighbouring source BSs, each target BS performs the resource partitioning taking into account the amount of traffic that should be expected to be handed over soon to it and its backhauled RNs. The new resource partitioning is announced to its backhauled RNs, i.e. the target BS in FIG. 1, by means of a resource partitioning indication message 130. However, only when the load balancing and/or the HO of UEs between source RN and target RN (see reference numeral 150 in FIG. 1) have been performed, the resource partitioning is really confirmed from the target BS to its backhauled target RN by a resource partitioning confirmation message 170. Otherwise, if the HO is going to be rejected anyhow there is no need to take the additional traffic into account.

According to the embodiment described here after accomplishing the HO there is further carried out a resource partitioning on the source side of the telecommunication network. Before actually accomplishing the HO this resource partitioning is pre-announced from the source BS to the source RN by means of a resource partitioning indication message 140. After having accomplished the HO and the resource partitioning also on the source side (see reference numeral 150) a corresponding resource partitioning confirmation message 160 is sent from the source BS to the source RN.

It is mentioned that the messages 110 and 140 can be obviously also sent between target BS and target RN when they are on a source side of a handover. The same holds for message 130, which may be also sent at the source side. Further, the message 130 between target BS target RN and the message 140 between source BS and source RN may be combined. This may mean that the messages 130 and 140 may have the same format. For the same reason, also messages 160 and 170 may be combined.

It has to be mentioned that (a) the resource partitioning indication message 130 from the target BS to the target RN and (b) the resource partitioning indication message 140 from the source BS to the source RN does not have a time order. In FIG. 1 the resource partitioning indication message 130 from the target BS to the target RN occurs first. However, also the reverse time order of the two resource partitioning indication messages may be possible. At the source side, the resource partitioning indication message 140 may also occur before the BS-to-BS indication message 120. The same also holds for the resource partitioning confirmation messages 160 and 170 between (a) the target BS and the target RN and (b) the source BS and the source RN.

It is further mentioned that in FIG. 1 it is illustrated the message flow for implementing the indication or the pre-announcement of the data traffic that the source RN will try to handover soon to the target RN if the decentralized approach for handover is assumed. The RN-to-BS indication message 110 and the Resource partitioning indication message 130 may be not needed in case the centralized approach for handover is used, because it is assumed that information regarding the access links (between RN and served UEs) have already been transferred from the RNs to the respective BS (and therefore the RN-to-BS indication message 110 may not be needed) as requested by the centralized approach. The centralized approach does not require that BS involves RNs, therefore it is not needed that the RNs are informed about the resource partitioning by means of the resource partitioning indication message 130, instead the BS decides centrally.

The described method for partitioning radio transmission resources within a telecommunication network based on a data traffic pre-announcement message may particularly comprise the following advantages:

(A) The HO of UEs to target RNs may be accomplished with a higher success probability. If enough radio transmission resources can be used for the backhaul and access link on the target side the HO of the UE from the source access point (e.g. the source RN) to the target access point (e.g. the target RN) will be successful. Radio transmission resource configurations can be started in advance before the actual HO takes place. Even if the radio transmission resource reconfiguration procedure requires more time than the HO and/or if the HO needs to be completed quickly, an appropriate radio transmission resource configuration will be in place once it is needed.

(B) The target BS can use pre-assigned resources for other purpose until UEs are handed over from the source RN to the target RN. For example, the pre-assigned resources can be used by UEs directly connected to the target BS. However, since the target BS needs the full flexibility to withdraw or to cancel the allocation of these pre-assigned resources, these resources should be used only for services that can accept such a cancellation or a withdrawal, respectively. Such non challenging services are e.g. best effort services. The pre-assigned resources are then really assigned to the backhaul and access links only when UEs are actually handed over to the target RN.

(C) The load balancing can be performed taking into account the pre-assigned resources to the backhaul and access links at the target RN. Therefore, if there are available resources identified by the target BS for the target RN, the load balancing can trigger a UE handover from the source RN (which is overloaded) to the target RN.

(D) The described pre-announcing of the new resource partitioning (and therefore the new MBSFN sub-frame configuration in case it is used for backhauling traffic) helps to quickly establish the new resource partitioning as soon as it is confirmed because the RN could already announce to its served UEs the sub-frames used as MBSFN sub-frames according to the new resource partitioning. In any case (as discussed above) these may be resources used by BS for serving directly connected UEs while the resource partitioning is not yet confirmed.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

110 RN-to-BS indication message
120 BS-to-BS indication message
130 resource partitioning indication message
140 resource partitioning indication message
150 load balancing and/or HO
160 resource partitioning confirmation message
170 resource partitioning confirmation message
BS1 source base station
BS2 target base station
CA1 source coverage area
CA2 target coverage area
RN1 source relay node
RN2a relay node
RN2b relay node
RN2c target relay node
UE user equipment

The invention claimed is:

1. A method, comprising:
   partitioning radio transmission resources within a telecommunication network, comprising:
   preparing a handover of a user equipment from a source access point being assigned to a source side of the telecommunication network to a target access point being assigned to a target side of the telecommunication network,
   transferring a pre-announcement message from the source side to the target side indicating the handover of the user equipment, wherein the pre-announcement message is indicative for the amount of data traffic being associated with the user equipment, and
   partitioning the radio transmission resources on the target side of the telecommunication network based on the pre-announcement message, wherein the pre-announcement message indicates a length of time that the partitioning of the radio transmission resources is valid.

2. The method as set forth in claim 1, wherein the source access point of the user equipment is
   a source base station or
   a source relay node being connected to a source base station.

3. The method as set forth in claim 1, wherein the target access point of the user equipment is
   a target base station or
   a target relay node being connected to a target base station.

4. The method as set forth in claim 3, wherein
   the target side of the telecommunication network comprises the target base station and a relay node being connected to the target base station, and
   wherein partitioning the radio transmission resources on the target side is carried out at the target base station or is negotiated between the target base station and the relay node being connected to the target base station.

5. The method as set forth in claim 1, wherein partitioning the radio transmission resources on the target side is carried out at a central unit that is responsible to perform the partitioning of radio transmission resources for one or more base stations.

6. The method as set forth in claim 1, wherein the source side is a source cell and the target side is a target cell.

7. The method as set forth in claim 1, wherein the pre-announcement message is transferred from a source base station to a target base station.

8. The method as set forth in claim 1, wherein
   the source access point is a source relay node being connected to a source base station,
   the target access point is a target relay node being connected to a target base station and
   the pre-announcement message is transferred from the source relay node to the target relay node.

9. The method as set forth in claim 1, wherein
   the source access point of the user equipment is a source base station,
   the target access point of the user equipment is a target relay node being connected to a target base station and
   the source base station and the target base station are the same entity within the telecommunication network.

10. The method as set forth in claim 1, further comprising
    carrying out the handover of the user equipment from the source access point to the target access point, and
    partitioning radio transmission resources on the source side based on the amount of data traffic that is associated with the user equipment.

11. The method as set forth in claim 1, wherein
    partitioning radio transmission resources on the target side comprises allocating radio transmission resources for the user equipment, and
    after partitioning the radio transmission resources and before carrying out the handover of the user equipment the allocated radio transmission resources are used for another radio data transfer.

12. The method as set forth in claim 1, wherein the pre-announcement message comprises an identification of the target side of the telecommunication network.

13. A non-transitory computer readable medium embodying a computer program for partitioning radio transmission resources within a telecommunication network, the computer program, when being executed by a data processor, is adapted for controlling the method as set forth in claim 1.

14. A source side network element comprising:
    at least one processor; and
    at least one memory including computer program code, where the at least one memory and the computer program code are configured, with the at least one processor, to cause the source side network element to at least:
    control a partitioning of radio transmission resources within a telecommunication network in connection with a handover of a user equipment from a source access point being assigned to a source side of the telecommunication network to a target access point being assigned to a target side of the telecommunication network, comprising
    transmitting a pre-announcement message from the source side to the target side indicating the handover of the user equipment,
    wherein the pre-announcement message is indicative for the amount of data traffic being associated with the user equipment,
    wherein the preannouncement message is adapted for controlling the partitioning of the radio transmission resources on the target side, and
    wherein the pre-announcement message indicates a length of time that the partitioning of the radio transmission resources is valid.

15. The source side network element as set forth in claim 14, wherein the source side network element comprises
    a source base station or
    a source relay node being connected to a source base station.

16. The source side network element as set forth in claim 14, further comprising carrying out the handover of the user equipment from the source access point to the target access point, and partitioning radio transmission resources on the source side based on the amount of data traffic that is associated with the user equipment.

17. A target side network element, comprising:

at least one processor; and at least one memory including computer program code, where the at least one memory and the computer program code are configured, with the at least one processor, to cause the target side network element to at least:

control a partitioning of radio transmission resources within a telecommunication network in connection with a handover of a user equipment from a source access point being assigned to a source side of the telecommunication network to a target access point being assigned to a target side of the telecommunication network, comprising receiving a pre-announcement message from the source side to the target side indicating the handover of the user equipment, wherein the pre-announcement message is indicative for the amount of data traffic being associated with the user equipment, wherein the pre-announcement message is adapted for controlling the partitioning of the radio transmission resources on the target side, and wherein the pre-announcement message indicates a length of time that the partitioning of the radio transmission resources is valid.

18. The target side network element as set forth in claim 17, wherein the target side network element comprises a target base station or a target relay node being connected to a target base station.

19. The target side network element as set forth in claim 17, wherein the partitioning comprises partitioning radio transmission resources on the target side comprising allocating radio transmission resources for the user equipment, and after partitioning the radio transmission resources and before carrying out the handover of the user equipment the allocated radio transmission resources are used for another radio data transfer.

* * * * *

UNITED STATES PATENT AND TRADEMARK OFFICE
CERTIFICATE OF CORRECTION

| | | |
|---|---|---|
| PATENT NO. | : 8,855,640 B2 | Page 1 of 1 |
| APPLICATION NO. | : 13/265967 | |
| DATED | : October 7, 2014 | |
| INVENTOR(S) | : Redana et al. | |

It is certified that error appears in the above-identified patent and that said Letters Patent is hereby corrected as shown below:

On the Title Page, Item (73), "Nokia Siemens Network Oy" should be deleted and --Nokia Siemens Networks Oy-- should be inserted.

Signed and Sealed this
Twenty-fourth Day of February, 2015

Michelle K. Lee
*Deputy Director of the United States Patent and Trademark Office*